(12) United States Patent
Huang et al.

(10) Patent No.: US 6,754,412 B2
(45) Date of Patent: Jun. 22, 2004

(54) APPARATUS AND METHOD FOR PRODUCING A FLAT-TOPPED FILTER RESPONSE FOR (DE)MULTIPLEXER HAVING A DIFFRACTION GRATING WITH VARIABLE LINE SPACING

(75) Inventors: Pei Huang, Lafayette, CO (US); Scott Spuler, Denver, CO (US)

(73) Assignee: Zolo Technologies, Inc., Boulder, CO (US)

( * ) Notice: Subject to any disclaimer, the term of this patent is extended or adjusted under 35 U.S.C. 154(b) by 43 days.

(21) Appl. No.: 10/209,229

(22) Filed: Jul. 31, 2002

(65) Prior Publication Data

US 2004/0022485 A1 Feb. 5, 2004

(51) Int. Cl.[7] ................................................. G02B 6/28
(52) U.S. Cl. .............................. 385/24; 385/37; 385/10
(58) Field of Search ............................... 385/10, 14, 15, 385/24, 31, 33, 37, 46; 398/FOR 115, FOR 118, FOR 121, FOR 122

(56) References Cited

U.S. PATENT DOCUMENTS

| | | | | |
|---|---|---|---|---|
| 6,141,152 | A | | 10/2000 | Trouchet .................. 385/24 |
| 6,266,464 | B1 | | 7/2001 | Day et al. ................. 385/24 |
| 6,304,692 | B1 | | 10/2001 | Sappey et al. ............. 385/24 |
| 6,415,080 | B1 | * | 7/2002 | Sappey et al. ............. 385/37 |
| 6,421,481 | B1 | * | 7/2002 | Sappey .................... 385/37 |
| 2003/0194183 | A1 | * | 10/2003 | Fondeur et al. ............ 385/37 |
| 2004/0005116 | A1 | * | 1/2004 | Sweetser et al. ........... 385/37 |

OTHER PUBLICATIONS

Bissen et al. (1997) SPIE 3150:130–136.
Kamalakis et al. (2001) Journal of Lightwave Technology 19:1716–1725.
Okamoto et al. (1995) Optics Letters 20:43–45.
Mansell et al. (1999) *Gaussian to Super–Gaussian Laser Beam Intensity Profile* presented at CLEO, May, 2000.
Song et al. (1997) IEEE Photonics Technology 9:58–60.

* cited by examiner

Primary Examiner—Phan T. H. Palmer
(74) Attorney, Agent, or Firm—Swanson & Bratschun LLC

(57) ABSTRACT

A (de)multiplexer for use in optical communications systems for multiplexing and demultiplexing an optical signal consisting of optical channel(s) of different wavelength(s) includes a multiplex optical waveguide propagating a plurality of optical channels and a plurality of single channel optical waveguides, each propagating a single channel. Each of the waveguides has a receiving/transmitting end. A diffraction grating is optically coupled between the multiplex optical waveguide and the single channel optical waveguides for diffracting an optical signal between the receiving/transmitting end of the multiplex optical waveguide and the receiving/transmitting end of the single channel optical waveguide. The grooves of the diffraction have spacing which varies according to an algorithm such that a portion of the optical signal diffracted by each groove is offset in a direction of dispersion relative to the portions of the optical signal diffracted by the other surfaces to broaden the transmission band at the receiving/transmitting ends of the single channel and multiplex optical waveguides. A method for fabricating a grating as described above includes etching grooves having spacing which varies according to the algorithm such that a portion of the optical signal diffracted by each surface is offset in a direction of dispersion relative to portions of the optical signal diffracted by each other surface.

14 Claims, 5 Drawing Sheets

APPARATUS AND METHOD FOR PRODUCING A FLAT-TOPPED FILTER RESPONSE FOR (DE)MULTIPLEXER HAVING A DIFFRACTION GRATING WITH VARIABLE LINE SPACING

RELATED APPLICATIONS

This application is related to co-pending and commonly-assigned U.S. application Ser. No. 09/628,774, filed on Jul. 29, 2000, entitled "Echelle Grating Dense Wavelength Division Multiplexer/Demultiplexer"; U.S. application Ser. No. 09/675,276, filed on Sep. 29, 2000, entitled "Apparatus and Method for Producing a Flat-Topped Filter Response for Diffraction Grating (De)Multiplexer"; U.S. Provisional Application Ser. No. 60/199,693, filed Apr. 26, 2000, entitled "Production of a Flat-Topped Filter Response for a Dense Wavelength Division (De)Multiplexer Based on Bulk Diffraction Gratings"; and U.S. Provisional Application Ser. No. 60/213,197, filed on Jun. 21, 2000, entitled "Production of a Flat-Topped Filter Response for a Dense Wavelength Division (De)Multiplexer Based on Bulk Diffraction Gratings". Each of these applications is incorporated herein by reference in its entirety.

TECHNICAL FIELD

The present invention is directed toward optical communications, and more particularly toward a bulk optical grating multiplexer/demultiplexer having a flat-topped filter response and a grating for producing a flat-topped filter response.

BACKGROUND ART

At the inception of fiber optic communications, typically a fiber was used to carry a single channel of data at a single wavelength. Dense wavelength division multiplexing (DWDM) enables multiple channels at distinct wavelengths within a given wavelength band to be sent over a single mode fiber, thus greatly expanding the volume of data that can be transmitted per optical fiber. The wavelength of each channel is selected so that the channels do not interfere with each other and the transmission losses to the fiber are minimized. Typical DWDM allows up to 40 channels to be simultaneously transmitted by a fiber.

DWDM requires two conceptually symmetric devices: a multiplexer and a demultiplexer. A multiplexer takes multiple beams or channels of light, each at a discrete wavelength and from a discrete source and combines the channels into a single multi-channel or polychromatic beam. The input typically is a linear array of waveguides such as a linear array of optical fibers, a linear array of laser diodes or some other optical source. The output is typically a single waveguide such as an optical fiber. A demultiplexer spacially separates a polychromatic beam into separate channels according to wavelength. Input is typically a single input fiber and the output is typically a linear array of waveguides such as optical fibers or a linear array of photodetectors.

In order to meet the requirements of DWDM, multiplexers and demultiplexers require certain inherent features. First, dispersive devices must be able to provide for a high angular dispersion of closely spaced channels so that individual channels can be separated over relatively short distances sufficiently to couple with a linear array of outputs such as output fibers. Furthermore, the multiplexer/demultiplexer must be able to accommodate channels over a free spectral range commensurate with fiber optic communications bandwidth. Moreover, the devices must provide high resolution to minimize crosstalk and must further be highly efficient to minimize signal loss. In addition, a single device is preferably reversible so it can function as both a multiplexer and a demultiplexer (hereinafter, a "(de) multiplexer"). The ideal device would also be small, durable, inexpensive and scalable.

Diffraction grating based (de)multiplexers have significant advantages over other technologies for dense wavelength division multiplexing applications because of their relatively low cost, high yield, low insertion loss crosstalk, uniformity of loss as well as their ability to multiplex a large number of channels concurrently. However, grating-based (de)multiplexers typically have a Gaussian filter function. For long-haul fiber networks with large numbers of (de) multiplexers cascaded in series, a significant overall narrowing of the filter function occurs, ultimately leading to large insertion loss at the pass band edges. For smaller metro networks, it is not necessary to cascade large numbers of (de)multiplexers in series. However, deployment of metro network equipment is extremely cost sensitive, and a Gaussian filter function requires that the wavelength of the emitting lasers be locked to a particular wavelength with tight precision. But lasers tend to drift for a number of reasons, including variation in ambient temperature and aging and providing improved lasers adds significant cost to the network equipment. A flat-topped filter response places much less stringent requirements on the stability tolerance of the laser wavelength.

A number of alternatives have been proposed for adapting grating based (de)multiplexers to provide a more flat-topped filter function. One solution, used with planar waveguide arrays, is the used of a flares or parabolic waveguide input. Such structures are shown in Okawa, U.S. Pat. No. 6,069,990, and Dragone, U.S. Pat. No. 5,002,350. A similar solution has been taught for (de)multiplexers using bulk optical gratings. Finegan, U.K. Patent No. GB 2,219,869, teaches a waveguide coupling device having an array of first optical waveguides for carrying optical channels with different wavelengths and a second optical waveguide for carrying a wavelength division multiplex of the optical channels. A diffraction grating is provided between the waveguides to couple channels between the respective first and second waveguides. Each waveguide is provided with an expanded tapered core which effectively widens or broadens the filter function of the (de)multiplexer. Finegan teaches that the fiber core and surrounding cladding may be made of silica with the cladding region doped with fluorine or the core region doped with Ge. Heating of the fiber can cause dopant diffusion providing a tapered core having a fluted cross section. However, providing uniform heating to the fibers to yield consistent diffusion with high yields and at reasonable costs has proven elusive.

Another method for approximating a flat-topped filter response in a bulk optic diffraction grating is taught by Martin, U.S. Pat. No. 6,084,695. Martin teaches a (de) multiplexer structure having a planar array of single channel fibers. A converging lens array is located in an input plane optically coupled to the single channel fibers with the single channel fibers placed at the focal point of the lenses. Martin teaches that the use of the converging lens array effectively broadens the filter function, improving the tolerance of the system to variations in the pass bands. The use of the microlens array taught by Martin increases part count and therefore part costs and assembly complexity, and does not, by itself, adequately provide a flat-topped filter response.

Yet another way to provide a flat-topped filter response for a (de)multiplexer is taught by Lee, U.S. Pat. No. 5,999,290.

Lee teaches the use of a 1 by 2 power splitter on an input waveguide and a 2 by 1 power splitter on an output waveguide to produce a flat-topped transmission band. Lee shows the power splitter used in conjunction with an arrayed waveguide (d e)multiplexer. Power splitters are known to introduce undesirable losses in the system.

Amersfoort, U.S. Pat. No. 5,629,992, discloses the use of a multimode interference ("MMI") filter coupled to the end of a multi-channel fiber or single channel fibers in a grating based demultiplexer, respectively. The multimode interference filter is sized to multiply a singly peaked profile to effectively present a flattened top profile to thereby reduce sensitivity to wavelength drift. Use of the MMI filter prevents the apparatus taught in Amersfoort from being usable as both a multiplexer and a demultiplexer.

Trouchet, U.S. Pat. No. 6,141,152, discloses a (de) multiplexer which includes a compound focusing mechanism having adjacent focal points to produce multiple images for each wavelength signal. The resulting spectral response is said to be flattened in the vicinity of the center wavelength of each signal. The optical components that are required to achieve this compound focusing in free space are difficult to fabricate economically. Furthermore, the tolerances of the mechanical mounting are quite stringent, making the system impractical to produce.

Co-pending and commonly-assigned U.S. patent application Ser. No. 09/675,276, by Sappey, teaches a (de) multiplexer which provides a flat-topped filter response without requiring addition of optical elements which can increase the complexity of manufacturing and cost as well as degrade product efficiency. More specifically, Sappey discloses an apparatus for radially expanding the effective size of a waveguide receiving/transmitting end in combination with a diffraction grating optically coupled between a multiplex optical waveguide and single channel optical waveguides for diffracting an optical signal between the receiving/transmitting ends of the single channel optical waveguides. The diffraction grating has at least two surfaces optically coupled to the waveguides, each having a plurality of grooves therein. Each of the surfaces is angularly displaced relative to each other surface by a select amount such that a portion of the optical signal diffracted by each surface is offset in the direction of dispersion relative to the portions of the optical signal diffracted by the other surfaces to broaden the transmission band at the receiving/transmitting ends of the single channel and multiplex optical waveguides. However, it has been found that the apparatus of Sappey may have some resolution drawbacks.

The present invention is intended to provide a flat-topped filter response for (de)multiplexers while overcoming some of the problems discussed above.

SUMMARY OF THE INVENTION

One aspect of the present invention is an apparatus for use in optical communications systems to multiplex or demultiplex an optical signal comprising optical channel(s) of different wavelength(s). The apparatus includes a multiplex optical waveguide propagating a plurality of optical channels, with the multiplex optical waveguide having a receiving/transmitting end. The apparatus further includes a plurality of single channel optical waveguides, each propagating a single channel and each having a receiving/transmitting end. A diffraction grating is optically coupled between the multiplex optical waveguide and the single channel optical waveguides for diffracting an optical signal between the receiving/transmitting ends of the single channel optical waveguides. The diffraction grating has a plurality of grooves thereon, the spacing of which varied in accordance with an algorithm.

Another aspect of the present invention includes a method for designing and fabricating a grating having a plurality of grooves thereon, the spacing of which varies in accordance with an algorithm in order to produce a flat-topped response.

A (de)multiplexer made in accordance with the present invention provides a flat-topped filter response without requiring the addition of optical elements to the (de) multiplexer which tend to increase the complexity of manufacturing and cost as well as degrade product efficiency.

DETAILED DESCRIPTION OF THE PREFERRED EMBODIMENT

Figure 1:
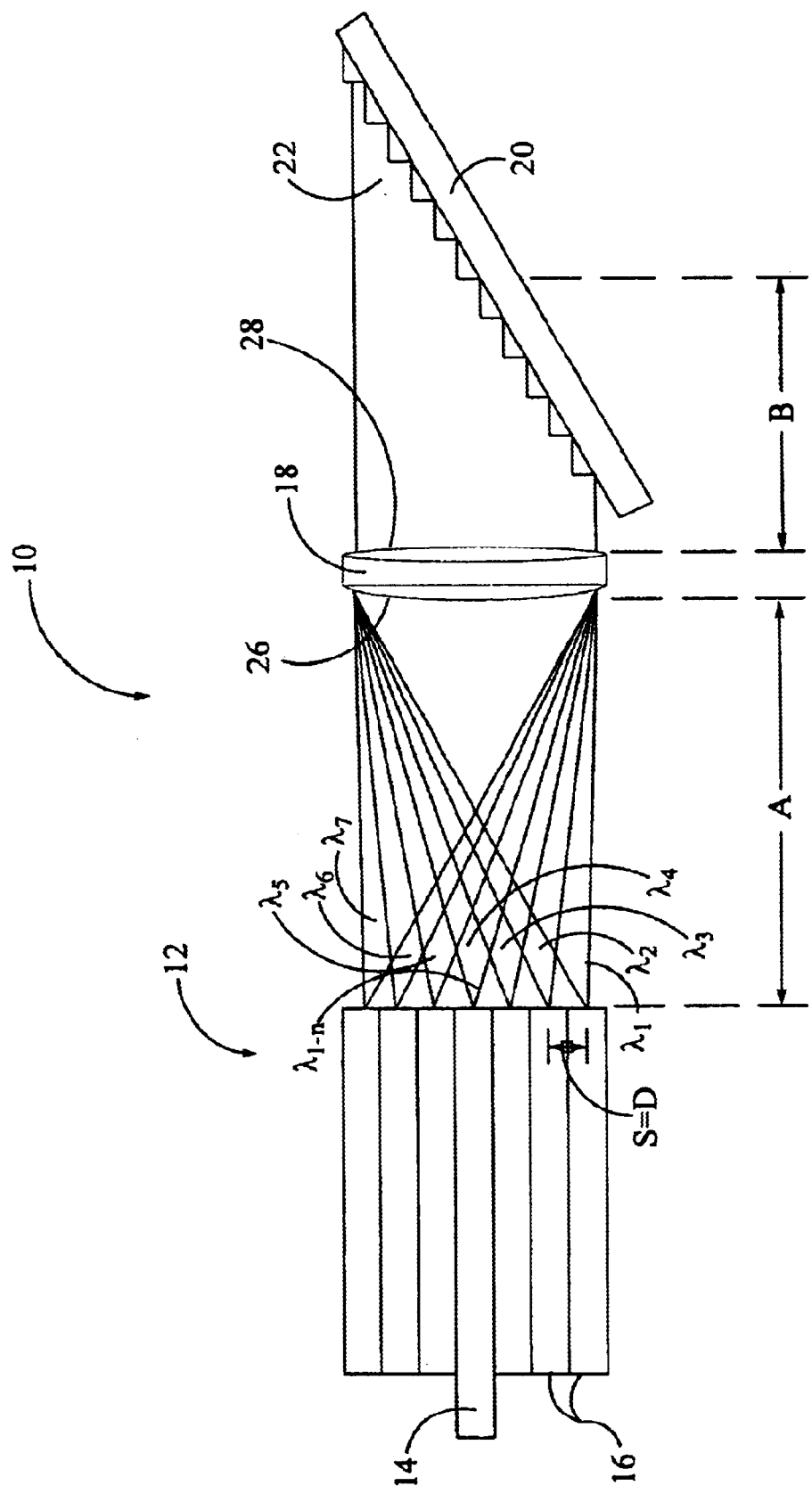
FIG. 1 is a schematic plan view of a multiplexer/demultiplexer using a bulk echelle grating in accordance with the present invention.

A multiplexer/demultiplexer for use in optical communication systems 10 is illustrated schematically in FIG. 1. It includes a pigtail harness 12 consisting of an input waveguide 14, a plurality of output waveguides 16 arranged in a linear array adjacent the input fiber, a collimated/focusing lent 18 and an echelle grating 20, all of which are optically coupled. In the present discussion the multiplexer/demultiplexer will be discussed in terms of a demultiplexer. The description applies equally to a multiplexer, only with the function of the input and output waveguides 14, 16 reversed. Also, for the sake of clarity, only seven output waveguides are illustrated (the center output waveguides underlies the input fiber in FIG. 1). Furthermore, the waveguides 14, 16 are preferably single mode optical fibers. Ninety or more output waveguides may be associated with a single input waveguide, depending upon the bandwidth, channel separation and other factors.

As used herein, "optically coupled" or "optically communicates" means any connection, coupling, link or the like, by which optical signals carried by one optical element are imparted to the "coupled" or "communicating" element. Such "optically communicating" devices are not necessarily directly connected to one another, but may be separated by a space through which the optical signals traverse or by intermediate optical components or devices.

As illustrated in FIG. 1, the multiplexer/demultiplexer 10 is in "near littrow configuration," meaning that the incident beam $\lambda_{1-n}$ and the channels diffracted off the surface of the grating $\lambda_1, \lambda_2, \lambda_3, \lambda_4, \lambda_5, \lambda_6, \lambda_7$ are generally along the same optical axis (that is, they trace a very close path) and the lens 18 both collimates the input beam $\lambda_{1-n}$ and focuses the diffracted channels $\lambda_1-\lambda_7$ to the output fibers 16.

The echelle grating 20, like other gratings such as echellette gratings, uses interference between light wavefronts reflected from various portions of its ruled surface or steps 22 to divide the incident beam consisting of a plurality of channels $\lambda_{1-n}$ having a select channel spacing within a select wavelength range $\lambda_{1-n}$ into separate channels of wavelength beams $\lambda_1-\lambda_7$ which are angularly dispersed by the grating into output waveguides 16 some distance away. Referring to FIG. 1, the channel separation of the device (D), which depends on the focal length of the focusing/collimating optic, the angular dispersion and the incremental channel spacing in wavelengths, is equal to the distance S between the center of adjacent output waveguides. The echelle grating 20 is particularly suited to use in optical communication systems because of a unique combination of properties: 1) it provides clear channel separation notwithstanding channels being closely spaced (0.4 nm or less); 2) it provides large spatial separation of channels over relatively short distances; and 3) it is highly efficient in the range of optical communications wavelengths.

Figure 2:
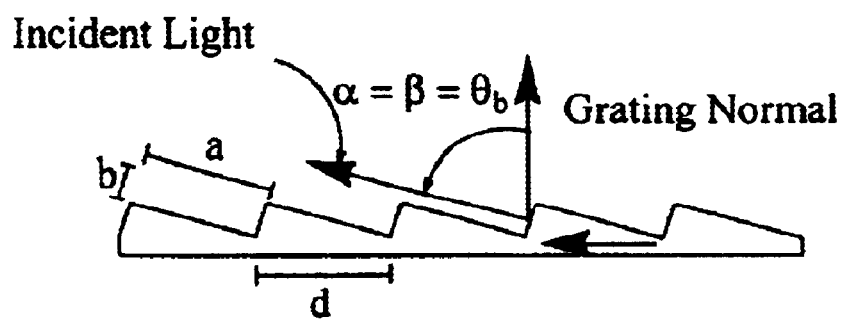
FIG. 2 is an enlarged cross-section of the echelle grating grooves illustrating relevant dimensions.

Referring to FIG. 2, an echelle grating is a special grating structure having groove density (1/d) of under 300 grooves/mm and a blaze angle $\theta_b$ of greater than 45° and typically operating at an order of diffraction greater than 1. In combination, these features enable a multiplexer/demultiplexer to efficiently separate closely spaced channels over a relatively small focal length (e.g., 5 inches) in a small form factor (on the order of 10 inches in length or less).

The echelle grating geometry is illustrated in FIG. 2, the variables being set forth below:

| | |
|---|---|
| $\theta_b$ = blaze angle | b = step (reflective surface) size |
| $\alpha$ = incident angle | d = 1/groove density |
| $\beta$ = diffracted angle | a = riser size |

(in littrow, $\theta_b = \alpha \cong \beta$)

The beam entering the (de)multiplexer device 10 via single mode fiber may reasonably be assumed to be approximately a Gaussian beam. The beam, scattered by the grooves of the diffraction grating 20, will arrive at the output fiber with a definite phase relationship. The consequent interference pattern generated at the output fiber determines the beam amplitude (i.e., the Fraunhoffer diffraction pattern). The spectral response of the device is the convolution of the output fiber image and the far field diffraction pattern from the grating 22. In the case of single mode fiber, an ideal far field diffraction pattern (i.e., one that yields a flat top spectral response) consists of two Gaussian beams with a small separation between peaks.

Figure 3:
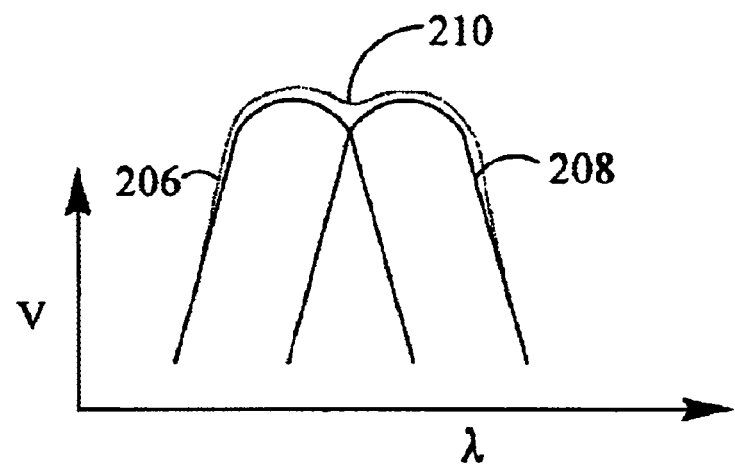
FIG. 3 illustrates the split Gaussian pass-bands produced by the grating of FIG. 1 and the resulting flat-topped filter function.
Figure 7:
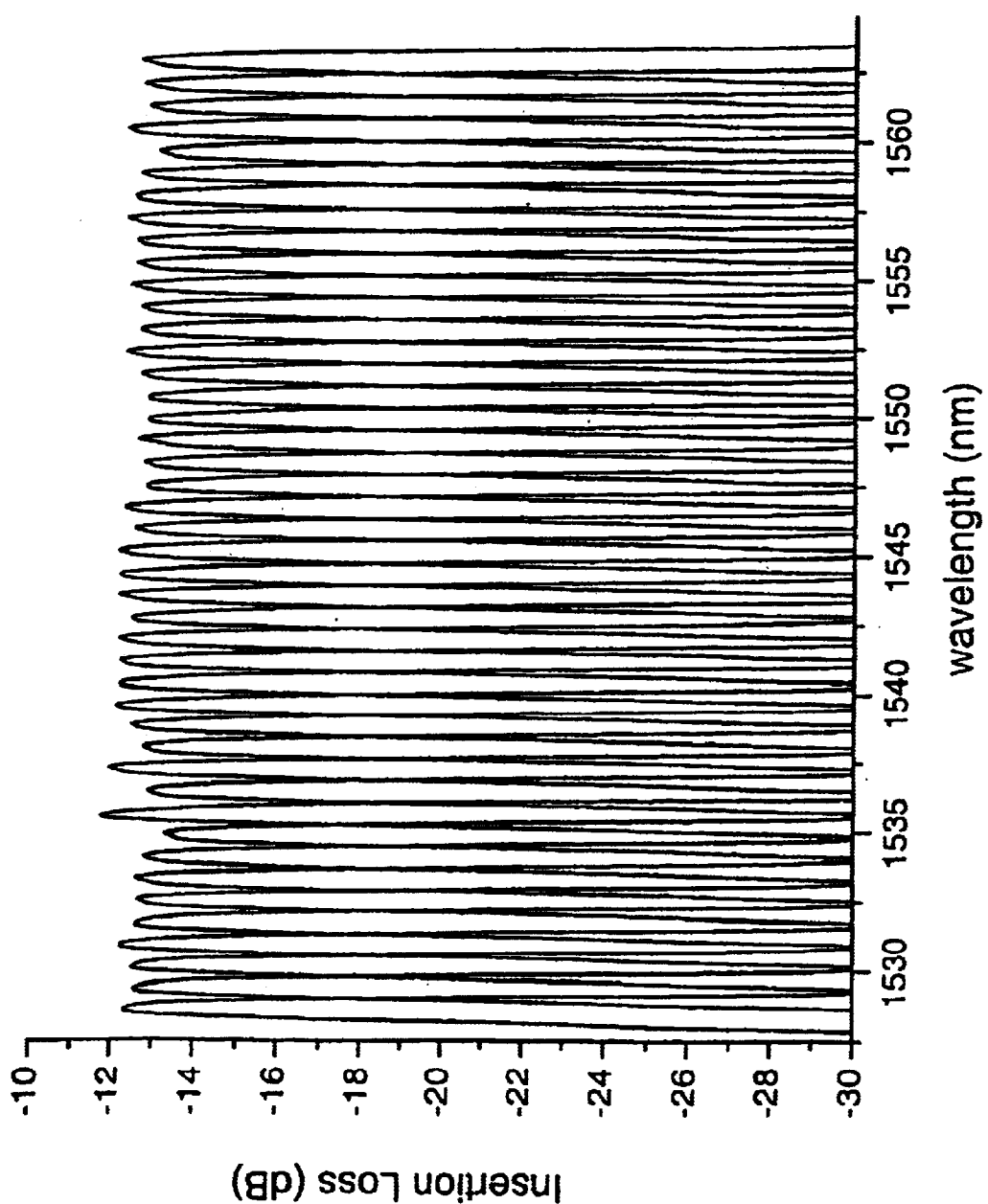
FIG. 7 is a plot of the system response versus wavelength for the multiplexer/demultiplexer of FIG. 1.

The desired result is illustrated in FIG. 3. Each of the two reflected beams from each step of the grating produces its own Gaussian function. The superposition of the two filter functions 206 and 208 approximate the desired flat-topped filter function 210. FIG. 7 is a plot of the system response (y-axis) versus wavelength (x-axis) for the variable space grating described above at 100 GHz (0.8 nm) channel spacing over the 1528–1565 nm bandwidth at an average insertion loss of about 13 db with a uniformity better than 1 db. This plot illustrates the flat insertion loss across the bandwidth.

Figure 4:
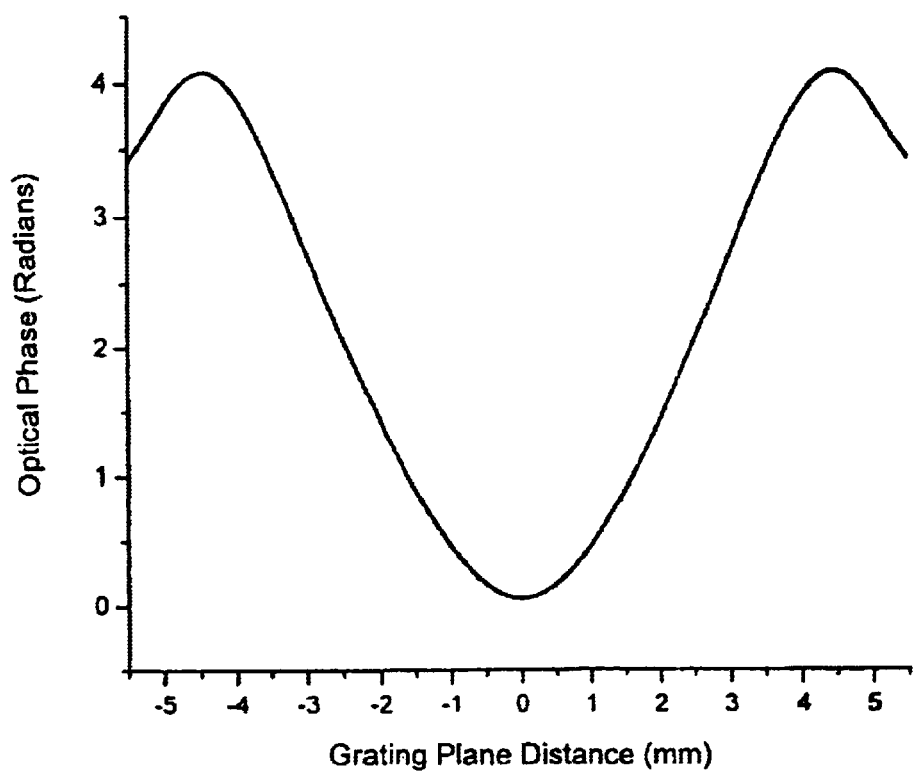
FIG. 4 is a plot of a phase solution generated by a simulated annealing algorithm in accordance with the present invention.

In accordance with the present invention, to design a device which produces a flat top spectral response, the grating wavefront phase variation has been designed with a simulated annealing algorithm. In simulated annealing, a target function is defined. In the present invention, the target was the ideal far-field beam profile at the exit fiber—the double Gaussian discussed above. A merit function was then defined, which is the difference between the target far-field amplitude and the current model iteration far-field amplitude. The algorithm is deliberately started with a bad fit in order to investigate most of the solution space. The algorithm progresses by adding pseudo-random incremental changes to the beam wavefront grating. The far-field amplitude at the exit fiber is computed by calculating the Fourier transform of the wavefront and input amplitude. The merit function is computed after each step. If the re-calculated merit function improves, the new wavefront is accepted or rejected based on a probability. The probability that a worse merit function is accepted is defined as $\exp(-\Delta S/T)$, where $\Delta S$ is the change in merit function and T is time. Utilizing the steps outlined above, the optimal wavefront changes imparted by the grating are calculated. The optimal phase solution is shown in FIG. 4.

Next, the groove spacing can be directly correlated to the phase variations across the grating surface in accordance with the equation:

$$d = d_0 - \frac{\Delta\phi}{2\pi} \frac{\lambda_c}{(\sin\alpha + \sin\beta)n}$$

where $d_0$ is the initial groove spacing, $\lambda_c$ is the center wavelength, $\Delta\phi$ is the phase change, $\alpha$ is the incident angle, $\beta$ is the diffracted angle. of the center wavelength, and n is the index of refraction of the ambient medium.

Figure 5:
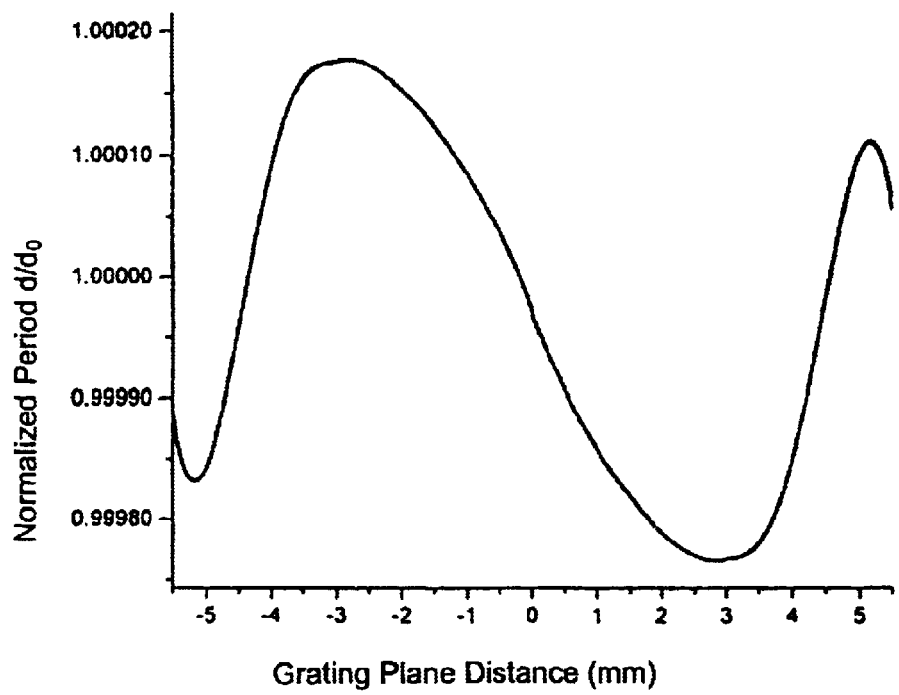
FIG. 5 is a plot of the variation of the grating period generated in accordance with the present invention.

For an optimal phase solution and specific application, the groove profile was calculated and the resultant grating period is shown in FIG. 5. Note that the amplitude of the period modulation is only about 0.017% of the period itself (5.8 $\mu$m) or about 1 nm resulting from the small splitting gap needed. This small amplitude period modulation requires precise control of the groove ruling. Other applications may have a period variation which is much larger.

Figure 6:
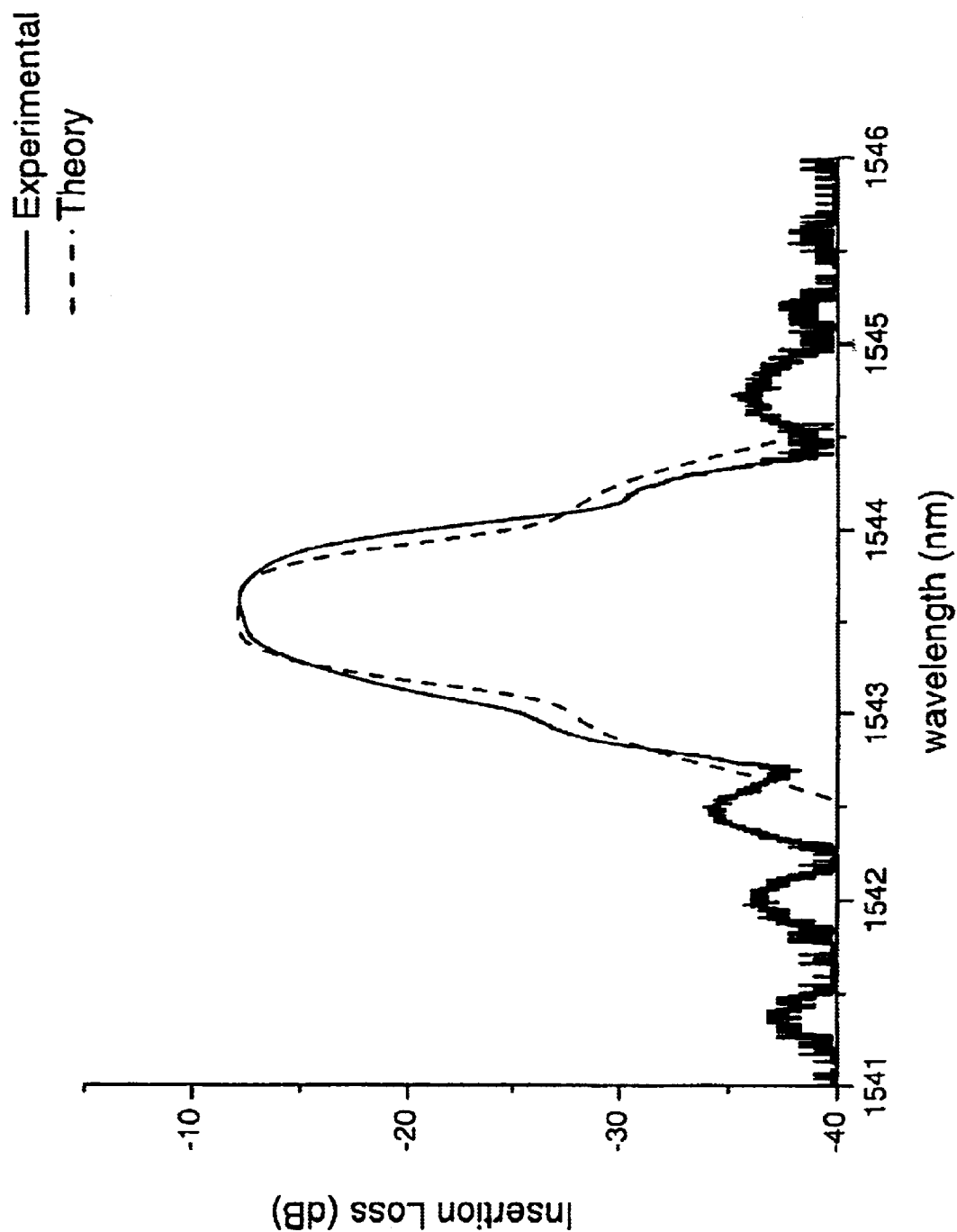
FIG. 6 is a plot of an exemplary ambient temperature transmission spectrum in accordance with the present invention.

Based on the theoretical model results plotted in FIGS. 4 and 5, Hyperfine, Inc. of Boulder, Colo. produced a mechanically ruled, blazed, variable space grating. The grating was determined experimentally to have an average efficiency of up to 65% over a 1525–1565 nm band. The variable space grating has been successfully demonstrated on a 44 channel, 100 GHz channel spacing device. An experimental transmission spectrum is shown as FIG. 6 which illustrates the measured filter spectrum of the variable period grating based demultiplexers. The flat top spectral response of the variable space grating has an average −0.5 dB and −1.0 dB passband of 40% and 55% of the channel spacing, respectively. The response is substantially symmetric for multiplexer or demultiplexer operation. Furthermore, the overall transmission spectra of all of the channels in the C-band have a good uniformity as shown in FIG. 7.

An alternative embodiment of the invention may be realized by the insertion of another piece of optics between the lens 18 and the constant period grating 20 in FIG. 1. The additional optic, a diffractive optical element, will generate the designated phase variation shown in FIG. 4. This embodiment is less desirable than the solution employing a variable period grating because it requires mounting a new element in the system.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. An apparatus for use in optical communications systems to multiplex or demultiplex an optical signal comprising optical channel(s) of distinct wavelength(s), the apparatus comprising:
   a multiplex optical waveguide propagating a plurality of optical channels, the multiplex optical waveguide having a receiving/transmitting end;
   a plurality of single channel optical waveguides each propagating a single channel, each single channel optical waveguide having a receiving/transmitting end; and
   a diffraction grating optically coupled between the multiplex optical waveguide and the single channel optical waveguides for diffracting an optical signal between the receiving/transmitting end of the multiplex optical waveguide and the receiving/transmitting ends of the single channel optical waveguides, the diffraction grating comprising a plurality of parallel grooves formed in a surface thereof, the grooves having variable spacing therebetween whereby said grating has a substantially flat-top spectral response.

2. The apparatus of claim 1 wherein the variable spacing between grooves is correlated to a desired phase change across the surface of said grating.

3. The apparatus of claim 2 wherein the correlation is determined according to $$d = d_0 - \frac{\Delta\phi}{2\pi} \frac{\lambda_c}{(\sin\alpha + \sin\beta)n}.$$

4. The apparatus of claim 2 wherein the desired phase change across said grating is calculated by the application of a simulated annealing algorithm.

5. A method broadening the transmission band of a (de)multiplexer used in fiber optic communications systems, the (de)multiplexer having a multiplex optical waveguide for propagating a plurality of optical channels, the multiplex optical waveguide having a receiving/transmitting end having an effective optical signal receiving size, a plurality of single channel optical waveguides each for propagating a single channel, each single channel optical waveguide having a receiving/transmitting end having an effective optical signal receiving size, and a diffraction grating optically coupled between the multiplex optical waveguide and the single channel optical waveguides for diffracting an optical signal between the receiving/transmitting end of the multiplex optical waveguide and the receiving/transmitting ends of the single channel optical waveguides, the diffraction grating having a plurality of parallel grooves formed in a surface therein, the method comprising:
   determining a desired phase change across the surface of the diffraction grating;
   correlating a spacing between adjacent grooves with the desired phase change wherein the spacing is variable across the surface of the grating; and
   forming the grooves in the surface of the grating in accordance with the correlation, whereby the grating has a substantially flat-top spectral response.

6. The method of claim 5 wherein the step of determining a desired phase change comprises applying a simulated annealing algorithm.

7. The method of claim 5 wherein the step of correlating comprises correlating according to $$d = d_0 - \frac{\Delta\phi}{2\pi} \frac{\lambda_c}{(\sin\alpha + \sin\beta)n}.$$

8. A diffraction grating for use in (de)multiplexing optical signals in an optical communications system, the diffraction grating having a plurality of parallel grooves formed in a surface thereof, the grooves having variable spacing therebetween whereby said grating has a substantially flat-top spectral response.

9. The diffraction grating of claim 8 wherein the variable spacing between grooves is correlated to a desired phase change across the surface of said grating.

10. The apparatus of claim 9 wherein the correlation is determined according to $$d = d_0 - \frac{\Delta\phi}{2\pi} \frac{\lambda_c}{(\sin\alpha + \sin\beta)n}.$$

11. The method of claim 9 wherein the desired phase change is calculated by applying a simulated annealing algorithm.

12. A method of manufacturing a diffraction grating for use in (de)multiplexing optical signals in an optical communications system, comprising:
   determining a desired phase change across a surface of the diffraction grating;
   correlating a spacing between adjacent grooves with the desired phase change wherein the spacing is variable across the surface of the grating; and
   forming the grooves in the surface of the grating in accordance with the correlation, whereby the grating has a substantially flat-top spectral response.

13. The apparatus of claim 12 wherein the correlation is determined according to $$d = d_0 - \frac{\Delta\phi}{2\pi} \frac{\lambda_c}{(\sin\alpha + \sin\beta)n}.$$

14. The method of claim 12 wherein the desired phase change is calculated by applying a simulated annealing algorithm.

* * * * *